(No Model.)
B. MILLHAUSER.
ANTI FRICTION BEARING.
No. 420,951. Patented Feb. 11, 1890.
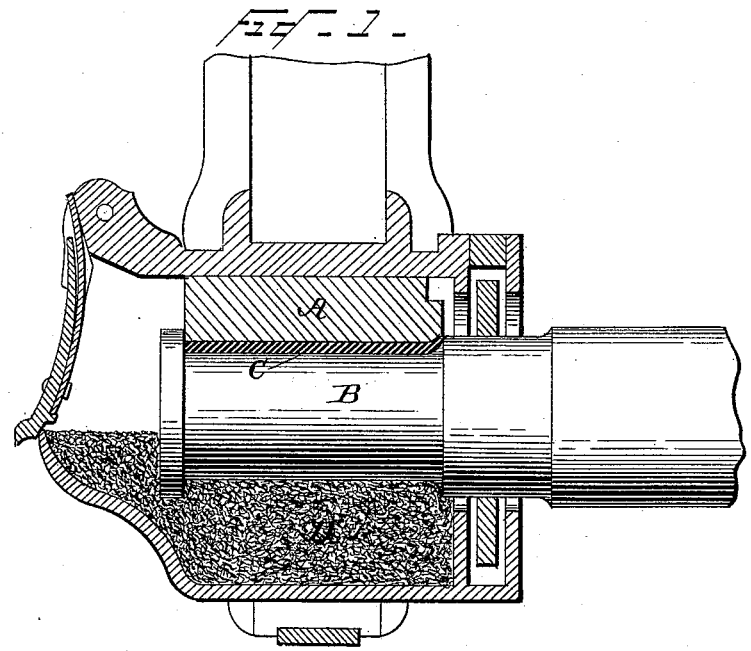
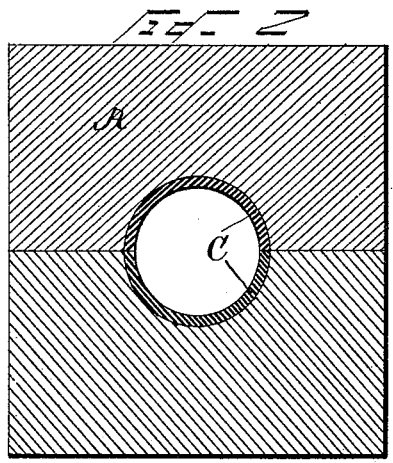
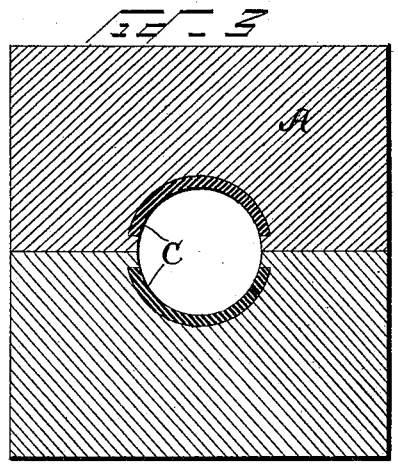
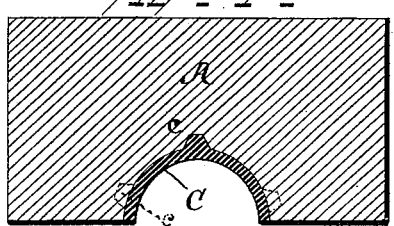
Witnesses
Norris A. Clark
L. A. Cromer Jr.
Inventor
B. Millhauser,
By his Attorney
Geo. P. Whittlesey.

UNITED STATES PATENT OFFICE.

BENEDICT MILLHAUSER, OF SCRANTON, PENNSYLVANIA.

ANTI-FRICTION BEARING.

SPECIFICATION forming part of Letters Patent No. 420,951, dated February 11, 1890.

Application filed September 7, 1889. Serial No. 323,323. (No model.)

*To all whom it may concern:*

Be it known that I, BENEDICT MILLHAUSER, a citizen of the United States, residing at Scranton, in the county of Lackawanna and State of Pennsylvania, have invented certain new and useful Improvements in Anti-Friction Bearings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to journal-boxes; and its object is to obviate the wear of the journal and box and to prevent their heating. Many ways of doing this have been proposed heretofore. The ordinary mode is to line the journal-box with one of the so-called "anti-friction" metals, compositions, or materials, such as Babbitt metal, lead, phosphor-bronze, asbestus, graphite, and many others. Prior to my invention, however, as far as I am aware, it has never been attempted to use either one of the materials hereinafter specified for the purpose and with the result that I have accomplished.

My invention consists in a bearing having one or both of its wearing-surfaces composed of celluloid or zylonite. The material may be applied to the journal-box as a lining either in sheets, strips, or separate plugs or blocks, or it may be applied to the journal itself as an encircling sleeve, or series of collars, or strips applied helically or lengthwise. It is preferably secured to the box or journal in any approved manner.

My anti-friction material is easily manipulated, and may be molded to fit the place it is to occupy, or may be simply cut to the proper size from sheets or blocks of celluloid or zylonite. The material is suitable for bearings of all kinds in which a journal rotates. It is especially advantageous for car-axles, lines of shafting, marine-engine shafts, and all bearings that are subjected to long and constant use with only occasional inspection. A bearing provided with a wearing-surface of celluloid or zylonite will run smooth and cool with very little oil and practically never wear out. It is preferable to apply the material to either the box or the journal only, though in some cases it may be of advantage to apply it to both.

An important feature of my invention is the fact that by its use I dispense with the brasses now used, which are costly to make, rapidly wear out, are liable to heat, and require careful attention.

My anti-friction wearing-surface can be applied to a cast-iron or steel box, and should it be necessary to renew it, which might occur after long use, the old lining could be easily removed and a new one slipped in, while even if the entire box had to be discarded it would involve but a trifling loss.

In the accompanying drawings, Figure 1 shows a car-axle box provided with my improvements. Figs. 2, 3, and 4 show boxes provided with slightly different linings.

A is the upper box, which may be of cast-iron or any cheap metal.

B is the journal of the car-axle, which rotates in contact with the lining C.

The box is provided with oiled waste D, as usual.

In Fig. 2 the lining C completely encircles the journal. In Fig. 3 the lining is shown as let into the boxes to keep it in position. In Fig. 4 the lining is provided with one or more projecting portions, lugs, or ribs c, which fit into recesses, sockets, or grooves in the box and retain it in place.

Other ways of fastening the lining will readily suggest themselves.

I am aware that it has been proposed to use horn, ivory, glass, and paper-pulp as anti-friction linings for bearings, but my invention has nothing to do with these, being confined to celluloid or zylonite, or equivalent compounds.

Having thus described my invention, what I claim, and desire to secure by Letters Patent, is—

1. A shaft-bearing having a wearing-surface composed of celluloid or zylonite, substantially as described.

2. A journal-box having its wearing-surface composed of celluloid or zylonite, substantially as described.

3. A journal-box having a lining of celluloid or zylonite, provided with projecting portions to enter recesses in the box and retain it in place, substantially as described.

In testimony whereof I affix my signature in presence of two witnesses.

BENEDICT MILLHAUSER.

Witnesses:
    W. J. LEWIS,
    W. DE GONTARD.